(12) United States Patent
Kitahata et al.

(10) Patent No.: US 10,894,538 B2
(45) Date of Patent: Jan. 19, 2021

(54) CONTROL APPARATUS FOR HYBRID VEHICLE

(71) Applicant: TOYOTA JIDOSHA KABUSHIKI KAISHA, Toyota (JP)

(72) Inventors: Takeshi Kitahata, Toyota (JP); Tooru Matsubara, Toyota (JP); Kazuyuki Shiiba, Miyoshi (JP); Koichi Okuda, Toyota (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/420,664

(22) Filed: May 23, 2019

(65) Prior Publication Data

US 2019/0367010 A1 Dec. 5, 2019

(30) Foreign Application Priority Data

Jun. 5, 2018 (JP) ................................ 2018-108085

(51) Int. Cl.
| | |
|---|---|
| *B60W 10/10* | (2012.01) |
| *B60W 20/20* | (2016.01) |
| *B60W 20/13* | (2016.01) |
| *B60W 30/192* | (2012.01) |

(52) U.S. Cl.
CPC ............ *B60W 20/20* (2013.01); *B60W 10/10* (2013.01); *B60W 20/13* (2016.01); *B60W 30/192* (2013.01)

(58) Field of Classification Search
None
See application file for complete search history.

(56) References Cited

U.S. PATENT DOCUMENTS

| | | | |
|---|---|---|---|
| 2015/0006000 A1 | 1/2015 | Kawata et al. | |
| 2016/0023652 A1* | 1/2016 | Soo | B60W 20/00 701/22 |
| 2016/0052511 A1* | 2/2016 | Takeuchi | B60W 10/08 701/22 |
| 2018/0037219 A1* | 2/2018 | Johri | F16H 61/21 |
| 2018/0134272 A1* | 5/2018 | Doering | B60K 6/547 |

FOREIGN PATENT DOCUMENTS

| | | |
|---|---|---|
| JP | 2009-035226 A | 2/2009 |
| JP | 2010-202119 A | 9/2010 |
| JP | 2013-052802 A | 3/2013 |
| JP | 2013-159260 A | 8/2013 |

\* cited by examiner

*Primary Examiner* — Justin Holmes
(74) *Attorney, Agent, or Firm* — Oliff PLC

(57) ABSTRACT

A control apparatus for a hybrid vehicle that includes an engine serving as a drive force source, an electric motor serving as a drive force source, drive wheels, a storage battery for supplying and receiving an electric power to and from the electric motor, a transmission mechanism for transmitting a drive force supplied from each of the drive force sources toward the drive wheels. During running of the hybrid vehicle by a drive force of the electric motor with the engine being stopped, the control apparatus is configured to determine whether the engine is to be started. When determining that the engine is to be started during the running of the hybrid vehicle, the control apparatus is configured to cause a gear ratio of the transmission mechanism to be changed and to cause the engine to be started after the gear ratio of the transmission mechanism has been changed.

16 Claims, 7 Drawing Sheets

| AT GEAR POSITION | C1 | C2 | B1 | B2 | F1 |
|---|---|---|---|---|---|
| 1st | ○ |  |  | △ | ○ |
| 2nd | ○ |  | ○ |  |  |
| 3rd | ○ | ○ |  |  |  |
| 4th |  | ○ | ○ |  |  |

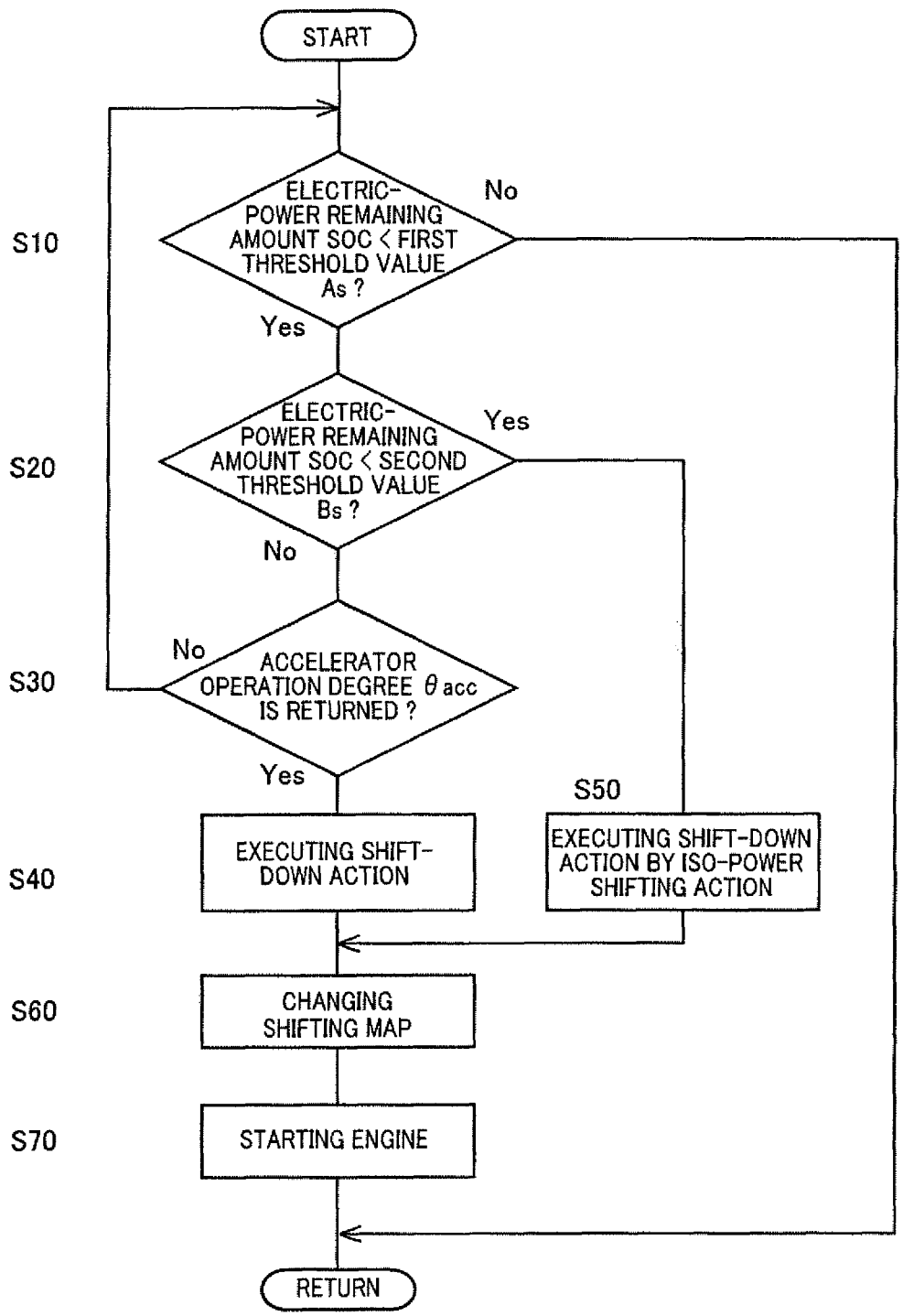

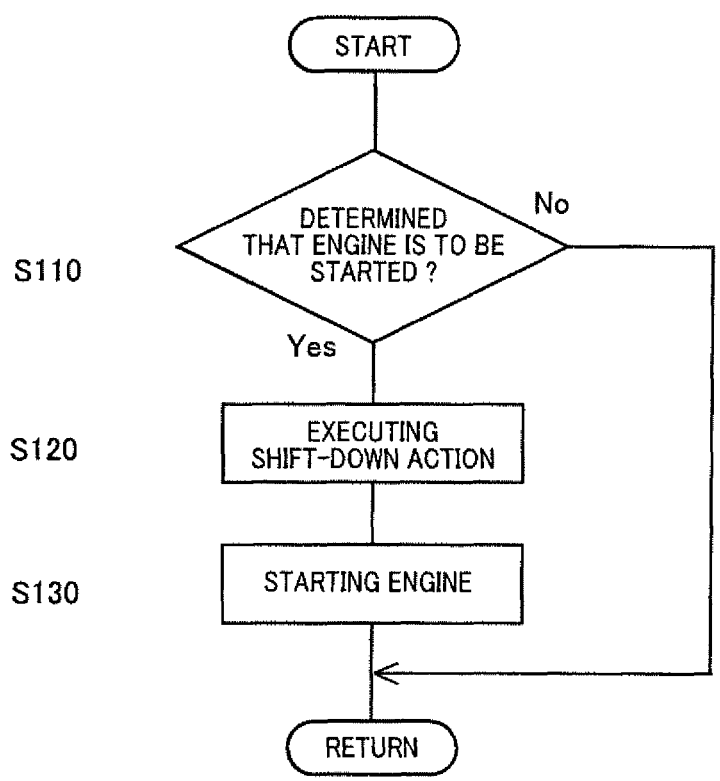

CONTROL APPARATUS FOR HYBRID VEHICLE

This application claims priority from Japanese Patent Application No. 2018-108085 filed on Jun. 5, 2018, the disclosure of which is herein incorporated by reference in its entirety.

FIELD OF THE INVENTION

The present invention relates to a control apparatus for a hybrid vehicle that includes an engine, an electric motor, a storage battery configured to supply an electric power to the electric motor, and a transmission mechanism. More particularly, the present invention is concerned with techniques for starting the engine by operation of the electric motor in such a hybrid vehicle.

BACKGROUND OF THE INVENTION

There is known a technique relating to a hybrid vehicle, in which, when an engine is to be started during running of the vehicle by operation of an electric motor with the engine being stopped, it is estimated whether the electric motor can provide a vehicle driving torque required to drive the vehicle and an engine starting torque required to start the engine, and the engine is started before the execution of the shifting action if it is estimated that the electric motor cannot provide the vehicle driving torque and the engine starting torque at the same time after the execution of the shifting action, for thereby avoiding the torque insufficiency of the electric motor. An example of such a technique is disclosed in JP-2013-159260A.

SUMMARY OF THE INVENTION

However, when a sum of the vehicle driving torque required to drive the vehicle and the engine starting torque required to start the engine exceeds a torque available by supply from the electric motor, due to insufficiency of an electric-power remaining amount of the storage battery, if the engine is started without delay, the vehicle driving torque is likely to be insufficient because the torque supplied from the electric motor is consumed also for the engine starting torque. Thus, there is a risk that the insufficiency of the vehicle driving torque could cause a shock due to change of a drive force for driving the vehicle.

The present invention was made in view of the background art described above. It is therefore an object of the present invention to reduce a shock which is caused, upon starting of an engine, by change of a drive force supplied from an electric motor to drive a vehicle, even when a sum of a vehicle driving torque required to drive the vehicle and an engine starting torque required to start the engine exceeds a torque available by supply from the electric motor, due to insufficiency of an electric-power remaining amount of a storage battery.

The object indicated above is achieved according to the following aspects of the present invention.

According to a first aspect of the invention, there is provided a control apparatus for a hybrid vehicle that includes an engine serving as a drive force source, an electric motor serving as a drive force source, drive wheels, a storage battery configured to supply and receive an electric power to and from the electric motor, a transmission mechanism configured to transmit a drive force supplied from each of the drive force sources toward the drive wheels, wherein, during running of the hybrid vehicle by the drive force of the electric motor with the engine being stopped, the control apparatus is configured to determine whether the engine is to be started, and wherein, when determining that the engine is to be started during the running of the hybrid vehicle, the control apparatus is configured to cause a gear ratio of the transmission mechanism to be changed (for example, increased) and to cause the engine to be started after the gear ratio of the transmission mechanism has been changed. For example, the control apparatus may comprise an engine start portion configured, during the running of the hybrid vehicle, to determine whether the engine is to be started, and a shift control portion configured, when the engine start portion determines that the engine is to be started, to cause the gear ratio of the transmission mechanism to be changed, wherein, when determining that the engine is to be started, the engine start portion is configured to cause the engine to be started after the gear ratio of the transmission mechanism has been changed by the shift control portion. It is noted that the object indicated above can be achieved also by a hybrid vehicle comprising: the engine, the electric motor, the drive wheels, the storage battery and the transmission mechanism that are defined in the first aspect of the invention; and the control apparatus according to the first aspect of the invention.

According to a second aspect of the invention, in the control apparatus according to the first aspect of the invention, the control apparatus is configured to cause the gear ratio of the transmission mechanism to be changed when an operation degree of an accelerator is reduced during the running of the hybrid vehicle.

According to a third aspect of the invention, in the control apparatus according to the first aspect of the invention, when causing the gear ratio of the transmission mechanism to be changed, the control apparatus is configured to control the electric motor such that a change of a magnitude of the drive force transmitted to the drive wheels between before and after change of the gear ratio is reduced.

According to a fourth aspect of the invention, in the control apparatus according to any one of the first through third aspects of the invention, the control apparatus is configured to determine that the engine is to be started during the running of the hybrid vehicle, when an amount of the electric power remaining in the storage battery is smaller than a first threshold value.

According to a fifth aspect of the invention, in the control apparatus according to the fourth aspect of the invention, the control apparatus is configured to cause the gear ratio of the transmission mechanism to be changed, when an operation degree of an accelerator is reduced during the running of the hybrid vehicle, with the amount of the electric power remaining in the storage battery being smaller than the first threshold value and not smaller than a second threshold value that is smaller than the first threshold value, wherein, when the amount of the electric power remaining in the storage battery is smaller than the second threshold value, the control apparatus is configured to cause the gear ratio of the transmission mechanism to be changed and to control the electric motor such that a change of a magnitude of the drive force transmitted to the drive wheels between before and after change of the gear ratio is reduced.

According to a sixth aspect of the invention, in the control apparatus according to the fourth or fifth aspect of the invention, the first threshold value is a predetermined value that is variable depending on an amount of the electric power consumed from the storage battery.

According to a seventh aspect of the invention, in the control apparatus according to the fourth or fifth aspect of the invention, the first threshold value is a predetermined value that is variable depending on a rate of change of the amount of the electric power remaining in the storage battery with respect to time.

According to an eighth aspect of the invention, in the control apparatus according to the fourth or fifth aspect of the invention, the first threshold value is a predetermined value that is variable depending on (i) an amount of the electric power consumed from the storage battery and (ii) a rate of change of the amount of the electric power remaining in the storage battery with respect to time.

According to a ninth aspect of the invention, in the control apparatus according to the fifth aspect of the invention, the second threshold value is a predetermined value that is variable depending on an amount of the electric power consumed from the storage battery.

According to a tenth aspect of the invention, in the control apparatus according to the fifth aspect of the invention, the second threshold value is a predetermined value that is variable depending on a rate of change of the amount of the electric power remaining in the storage battery with respect to time.

According to an eleventh aspect of the invention, in the control apparatus according to the fifth aspect of the invention, the second threshold value is a predetermined value that is variable depending on (i) an amount of the electric power consumed from the storage battery and (ii) a rate of change of the amount of the electric power remaining in the storage battery with respect to time.

According to a twelfth aspect of the invention, in the control apparatus according to any one of the first through third aspects of the invention, the control apparatus is configured to determine whether the engine is to be started or not, based on a running plan including at least one area in which the hybrid vehicle runs.

According to a thirteenth aspect of the invention, in the control apparatus according to any one of the first through third aspects of the invention, the control apparatus is configured to determine whether the engine is to be started or not, depending on a temperature of the engine during running of the vehicle and/or a length of time for which the engine is stopped during running of the vehicle.

According to the first aspect of the invention, there is provided a control apparatus for a hybrid vehicle that includes an engine serving as a drive force source, an electric motor serving as a drive force source, drive wheels, a storage battery configured to supply and receive an electric power to and from the electric motor, a transmission mechanism configured to transmit a drive force supplied from each of the drive force sources toward the drive wheels, wherein, during running of the hybrid vehicle by the drive force of the electric motor with the engine being stopped, the control apparatus is configured to determine whether the engine is to be started, and wherein, when determining that the engine is to be started during the running of the hybrid vehicle, the control apparatus is configured to cause a gear ratio of the transmission mechanism to be changed and to cause the engine to be started after the gear ratio of the transmission mechanism has been changed. Owing to these arrangements, when it is determined that the engine is to be started during the running of the vehicle by operation of the electric motor with the engine being stopped, the gear ratio of the transmission mechanism is changed to, for example, a gear ratio value that makes a shock upon starting of the engine smaller than a gear ratio which has been established in the transmission mechanism before the gear ratio change, so that it is possible to reduce the shock which is caused, upon starting of the engine, by change of a drive force supplied from the electric motor to drive the vehicle, even when a sum of a vehicle driving torque required to drive the vehicle and an engine starting torque required to start the engine exceeds a torque available by supply from the electric motor, due to insufficiency of an electric-power remaining amount of the storage battery.

According to the second aspect of the invention, the control apparatus is configured to cause the gear ratio of the transmission mechanism to be changed when the operation degree of the accelerator is reduced during the running of the hybrid vehicle. Even if a shock is caused by the change of the gear ratio of the transmission mechanism, uncomfortable feeling is unlikely to be given to an operator of the vehicle, because the gear ratio of the transmission mechanism is changed as a result of the reduction of the operation degree of the accelerator which is made by an operation of the operator.

According to the third aspect of the invention, when causing the gear ratio of the transmission mechanism to be changed, the control apparatus is configured to control the electric motor such that the change of the magnitude of the drive force transmitted to the drive wheels between before and after the change of the gear ratio is reduced. Owing to this arrangement, a shock caused by the change of the gear ratio of the transmission mechanism is reduced.

According to the fourth aspect of the invention, the control apparatus is configured to determine that the engine is to be started during the running of the hybrid vehicle, when the amount of the electric power remaining in the storage battery is smaller than the first threshold value. Owing to this arrangement in which it is determined that the engine is to be started when the electric-power remaining amount of the storage battery is small, the engine is determined to be started at an appropriate point of time, so that a shock caused upon starting of the engine is reduced.

According to the fifth aspect of the invention, the control apparatus is configured to cause the gear ratio of the transmission mechanism to be changed, when the operation degree of the accelerator is reduced during the running of the hybrid vehicle, with the amount of the electric power remaining in the storage battery being smaller than the first threshold value and not smaller than the second threshold value that is smaller than the first threshold value, wherein, when the amount of the electric power remaining in the storage battery is smaller than the second threshold value, the control apparatus is configured to cause the gear ratio of the transmission mechanism to be changed and to control the electric motor such that the change of the magnitude of the drive force transmitted to the drive wheels between before and after change of the gear ratio is reduced. Even if a shock is caused by the change of the gear ratio of the transmission mechanism which is made as a result of the reduction of the operation degree of the accelerator, uncomfortable feeling is unlikely to be given to the vehicle operator, because the gear ratio of the transmission mechanism is changed as a result of an operation of the operator by which the operation degree of the accelerator is reduced. Further, when the electric-power remaining amount of the storage battery is small, a higher priority is given to starting of the engine and the electric motor is controlled to reduce the change of the magnitude of the drive force transmitted to the drive wheels between before and after the change of the gear ratio, whereby a shock caused by the change of the gear ratio is reduced.

According to the sixth aspect of the invention, the first threshold value is a predetermined value that is variable depending on the amount of the electric power currently consumed from the storage battery. Owing to this arrangement, the first threshold value can be set accurately.

According to the seventh aspect of the invention, the first threshold value is a predetermined value that is variable depending on the rate of change of the amount of the electric power remaining in the storage battery with respect to time. Owing to this arrangement, the first threshold value can be set more accurately.

According to the eight aspect of the invention, the first threshold value is a predetermined value that is variable depending on (i) the amount of the electric power currently consumed from the storage battery and (ii) the rate of change of the amount of the electric power remaining in the storage battery with respect to time. Owing to this arrangement, the first threshold value can be set more accurately.

According to the ninth aspect of the invention, the second threshold value is a predetermined value that is variable depending on the amount of the electric power currently consumed from the storage battery. Owing to this arrangement, the second threshold value can be set accurately.

According to the tenth aspect of the invention, the second threshold value is a predetermined value that is variable depending on the rate of change of the amount of the electric power remaining in the storage battery with respect to time. Owing to this arrangement, the second threshold value can be set more accurately.

According to the eleventh aspect of the invention, the second threshold value is a predetermined value that is variable depending on (i) the amount of the electric power currently consumed from the storage battery and (ii) the rate of change of the amount of the electric power remaining in the storage battery with respect to time. Owing to this arrangement, the second threshold value can be set more accurately.

According to the twelfth aspect of the invention, the control apparatus is configured to determine whether the engine is to be started or not, based on a running plan including at least one area in which the hybrid vehicle runs. For example, where a higher priority is to be given to the running by the drive force of the electric motor during running of the vehicle in a particular urban area, when it is determined that the engine is to be started during the running of the vehicle, the gear ratio of the transmission mechanism is changed to, for example, a gear ratio value that makes a shock upon starting of the engine smaller than a gear ratio which has been established in the transmission mechanism before the gear ratio change, so that it is possible to reduce the shock which is caused, upon starting of the engine, by change of the drive force supplied from the electric motor to drive the vehicle, and to assure the electric-power remaining amount of the storage battery sufficiently so as to be ready for the running by the drive force of the electric motor.

According to the thirteenth aspect of the invention, the control apparatus is configured to determine whether the engine is to be started or not, depending on a temperature of the engine during running of the vehicle and/or a length of time for which the engine is stopped during running of the vehicle. Thus, when the temperature of the engine is low and/or when the length of time for which the engine is stopped is long, namely, when it is desirable to start the engine, the engine is started after the gear ratio of the transmission mechanism is changed to, for example, a gear ratio value that makes a shock upon starting of the engine smaller. Owing to this arrangement, it is possible to reduce a shock which is caused, upon starting of the engine, by change of the drive force applied to drive the vehicle, and also to keep the engine in a fine condition.

BRIEF DESCRIPTION OF THE DRAWINGS

FIG. 9 is a flow chart showing a control routine that is to be executed for changing the gear position of the transmission mechanism and starting the engine, depending on the electric-power remaining amount of the storage battery in the vehicle shown in FIG. 1; and FIG. 10 is a flow chart showing a control routine that is to be executed for changing the gear position of the transmission mechanism and starting the engine, depending on a running plan, an engine temperature or an engine stop time, for example.

DETAILED DESCRIPTION OF PREFERRED EMBODIMENTS

Hereinafter, some embodiments of the invention will be described in detail with reference to the accompanying drawings. The figures of the drawings are simplified or deformed as needed, and each portion is not necessarily precisely depicted in terms of dimension ratio, shape, etc.

First Embodiment

Figure 1:
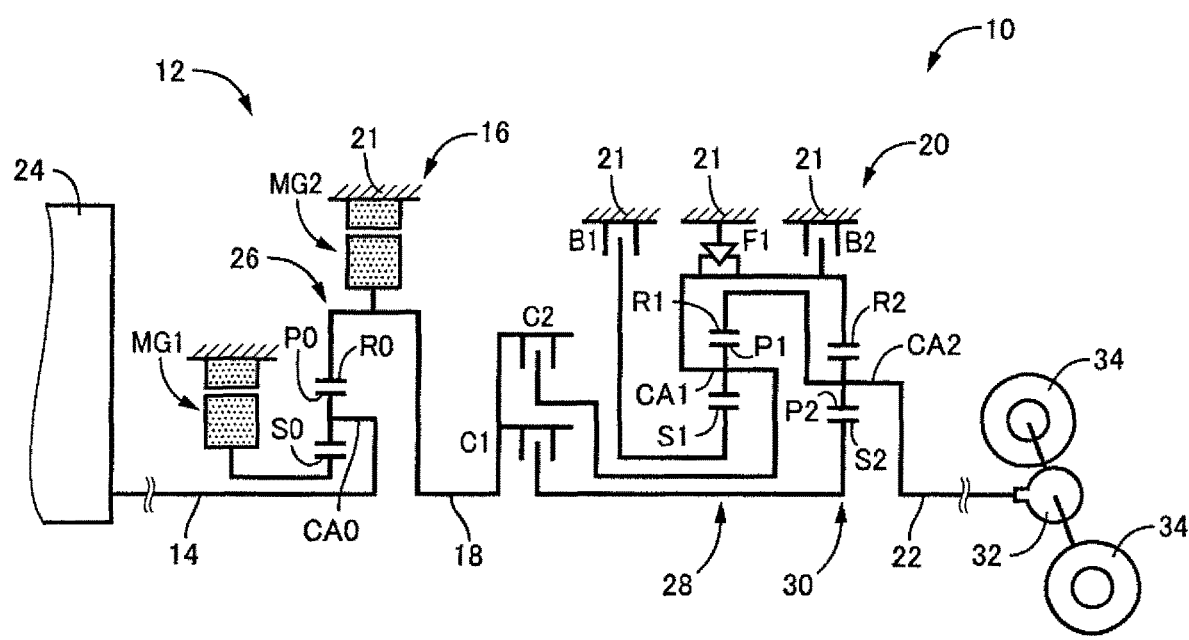
FIG. 1 is a schematic view showing a vehicle to which the present invention is applied, and explaining parts of the vehicle which are involved in running of the vehicle.

FIG. 1 is a view schematically showing an outline of a construction of a vehicle 10 that corresponds to "hybrid vehicle" recited in the appended claims. The present invention, which is applied to a hybrid vehicle, is more preferably applied to a so-called "plug-in hybrid vehicle" in which a relatively large amount of electric power is available to electric motors MG1, MG2 owing to the use of an external electric power source, because it is preferable that a running distance by the electric motors MG1, MG2 is increased. As shown in FIG. 1, the vehicle 10 is equipped with a driving apparatus 12 that is suitably used in a FR (front-engine rear-drive) vehicle. The driving apparatus 12 includes: a non-rotatable member in the form of a transmission casing 21 that is attached to a body of the vehicle 10; an input rotary member in the form of an input shaft 14; a continuously-variable transmission portion in the form of a differential portion 16 that is connected to the input shaft 14 directly or indirectly via a pulsation absorbing damper (not shown) or the like; a transmission mechanism in the form of a step-variable transmission portion 20 that is connected to the differential portion 16 in a series through a transmitting member (transmitting shaft) 18 in a drive-force transmitting path between the differential portion 16 and a pair of drive wheels 34; and an output rotary member in the form of an output shaft 22 that is connected to the step-variable transmission portion 20. The input shaft 14, differential portion 16, step-variable transmission portion 20 and output shaft 22 are disposed on a common axis within the transmission casing 21, and are connected in a series.

The driving apparatus 12 further includes an internal combustion engine 24 such as a gasoline engine and a diesel engine, which serves as a drive force source for driving the vehicle 10 and which is connected directly to the input shaft 14 with or without a pulsation absorbing damper (not shown) being disposed between the engine 24 and the input shaft 14. The driving apparatus 12 serves as a drive-force transmitting apparatus configured to transmit a drive force generated by the engine 24 to the pair of drive wheels 34 via the differential portion 16, the step-variable transmission portion 20 and a differential gear device 32 that are disposed in a drive-force transmitting path between the engine 24 and the pair of drive wheels 34. In the driving apparatus 12 in the present embodiment, the engine 24 and the differential portion 16 are connected directly to each other, without a fluid transmitting device (such as a torque converter and a fluid coupling device) disposed therebetween. It is noted that the direct connection between the engine 24 and the differential portion 16 is interpreted to encompass, for example, a connection therebetween via the above-described pulsation absorbing damper or the like. It is further noted that the driving apparatus 12 is constructed substantially symmetrically about its axis (about the above-indicated common axis), so that a lower half of the driving apparatus 12 is not shown in FIG. 1.

The differential portion 16 includes a first electric motor MG1, a drive-force distributing device 26 and a second electric motor MG2. The drive-force distributing device 26 is a mechanical mechanism configured to mechanically distribute an output of the engine 24 inputted to the input shaft 14, into the first electric motor MG1 and the transmitting member 18. The second electric motor MG2 is operatively connected to the transmitting member 18 so as to be rotated integrally with the transmitting member 18. It is preferable that each of the first and second electric motors MG1, MG2, which are provided in the driving apparatus 12, is a motor generator functioning as a motor and a generator. However, each of the first and second electric motors MG1, MG2 does not have to necessarily function as both of a motor and a generator, as long as the first electric motor MG1 has at least a generator function for generating a reaction force and the second electric motor MG2 has at least a motor function for outputting a drive force for driving the vehicle 10 so as to serves as a drive force source. An operation state of the differential portion 16, which is constructed as described above, is controlled through the first and second electric motors MG1, MG2, so that the differential portion 16 serves as an electric differential portion whose differential state of an input rotational speed (corresponding to a rotational speed of the input shaft 14) and an output rotational speed (corresponding to a rotational speed of the transmitting member 18) is controlled by the first and second electric motors MG1, MG2.

The drive-force distributing device 26 is constituted principally by a planetary gear device of single-pinion type. The planetary gear device includes rotary elements in the form of a sun gear S0, planetary gears P0, a carrier CA0 that supports the planetary gears P0 such that each of the planetary gears P0 is rotatable about its axis and revolvable about the above-described common axis, and a ring gear R0 that meshes with the sun gear S0 through the planetary gears P0. The carrier CA0 is connected to the engine 24 through the input shaft 14, the sun gear S0 is connected to the first electric motor M1, and the ring gear R0 is connected to the transmitting member 18. In the drive-force distributing device 26 as the differential mechanism, the sun gear S0 constitutes a first rotary module RE1, the carrier CA0 constitutes a second rotary module RE2, and the ring gear R0 constitutes a third rotary module RE3. The carrier CA0 functions as an input element, the sun gear S0 functions as a reaction element, and the ring gear R0 functions as an output element.

The drive-force distributing mechanism 26 constructed as described above is placed in a differential state in which the sun gear S0, carrier CA0 and ring gear R0 are rotatable relative to one another, thereby providing a differential effect. In the differential state, the output of the engine 24 is distributed to the first electric motor M1 and the transmitting member 18, so that a part of the output of the engine 24 is used to drive the first electric motor M1 to generate an electric energy that is to be stored or used to drive the second electric motor M2. Thus, the differential portion 16 (drive-force distributing mechanism 26) functions as an electric differential device, which is placed in a continuously-variable shifting state (electrically established CVT state) in which the rotational speed of the transmitting member 18 is continuously variable, irrespective of a certain rotational speed of the engine 24. That is, the differential portion 16 serves as an electrically continuously-variable transmission whose gear ratio γ0 (=rotational speed Nin of input shaft 14/rotational speed N18 of the transmitting member 18) is continuously variable between its minimum ratio value γ0min and its maximum value γ0max. Thus, with the operation states of the first and second electric motors MG1, MG2 and the engine 24, each of which is connected to the drive-force distributing device 26 (differential portion 16) in a drive-force transmittable manner, being controlled, the differential portion 16 is operated as a continuously-variable transmission mechanism whose differential state is controlled, wherein the differential state is defined by a difference between the rotational speed of the input shaft 14 and the rotational speed of the transmitting member 18 that serves as an output shaft of the differential portion 16.

The driving apparatus 12 is configured to establish a selected one of various running states (various running modes) such as an EV running state (EV running mode), an engine running state (engine running mode) and a hybrid running state (hybrid running mode). With the EV running state being established, at least one of the first and second electric motors MG1, MG2 (preferably, the electric motor MG2) is operated as the drive force source to drive the vehicle 10 while the engine 24 is stopped. With the engine running mode being established, the engine 24 is operated as the drive force source to drive the vehicle 10 while the first and second electric motors MG1, MG2 are idled or regeneratively operated. When the hybrid running state being established, the engine 24 and the second electric motor MG2 are operated as the drive force sources to drive the vehicle 10 while the first electric motor MG1 is regeneratively operated as needed.

The step-variable transmission portion 20 is disposed in a series with the drive-force distributing device 26 in a drive-force transmitting path between the engine 24 and the pair of drive wheels 34, and is configured to establish one of a plurality of gear positions, by engaging a corresponding one or ones of a plurality of engagement devices included in the step-variable transmission portion 20. The step-variable transmission portion 20 is constituted principally by planetary gear devices 28, 30 of single-pinion type. The planetary gear device 28 includes rotary elements in the form of a sun gear S1, planetary gears P1, a carrier CA1 that supports the planetary gears P1 such that each of the planetary gears P1 is rotatable about its axis and revolvable about the above-described common axis, and a ring gear R1 that meshes with the sun gear S1 through the planetary gears P1. The planetary gear device 30 includes rotary elements in the form of a sun gear S2, planetary gears P2, a carrier CA2 that supports the planetary gears P2 such that each of the planetary gears P2 is rotatable about its axis and revolvable about the above-described common axis, and a ring gear R2 that meshes with the sun gear S2 through the planetary gears P2.

The step-variable transmission portion 20 includes the above-described engagement devices in the form of first and second clutches C1, C2 (hereinafter simply referred to as clutches C unless they are to be particularly distinguished from each other) and first and second brakes B1, B2 (hereinafter simply referred to as brakes B unless they are to be particularly distinguished from each other). Each of the clutches C and brakes B is a hydraulically-operated friction engagement device or engagement element that has been used in a conventional vehicle automatic transmission, and may be constituted, for example, a wet-type multiple-disc clutch including a plurality of friction plates which are superposed on each other and which are forced against each other by a hydraulic actuator, or a band brake including a rotary drum and one band or two bands which is/are wound on the outer circumferential surface of the rotary drum and tightened at one end by a hydraulic actuator. Each of the clutches C and brakes B is selectively engaged for connecting two members between which each clutch or brake is interposed. To each of the clutches C and brakes B, a hydraulic pressure, which is regulated by a hydraulic control unit 44 (see FIG. 4) in accordance with a hydraulic command value supplied from an electronic control apparatus 70 (see FIG. 4), is supplied, so that an operation state of each of the clutches C and brakes B is controlled.

In the step-variable transmission portion 20, the sun gear S1 is selectively connected to the transmission casing 21 through the brake B1. The carrier CA1 and the ring gear R2 are integrally connected to each other, and are selectively connected to the casing 21 through the brake B2. The carrier CA1 and the ring gear R2 are allowed, by an one-way clutch F1 as an engagement device, to be rotated in one of opposite directions relative to the casing 21, and are inhibited, by the one-way clutch F1, from being rotated in the other of the opposite directions relative to the casing 21. The sun gear S2 is selectively connected to the transmitting member 18 through the first clutch C1. The carrier CA1 and the ring gear R2, which are integrally connected to each other, are selectively connected to the transmitting member 18 through the second clutch C2. The ring gear R1 and the carrier CA2 are integrally connected to each other, and are connected to the output shaft 22.

Figures 2, 3:
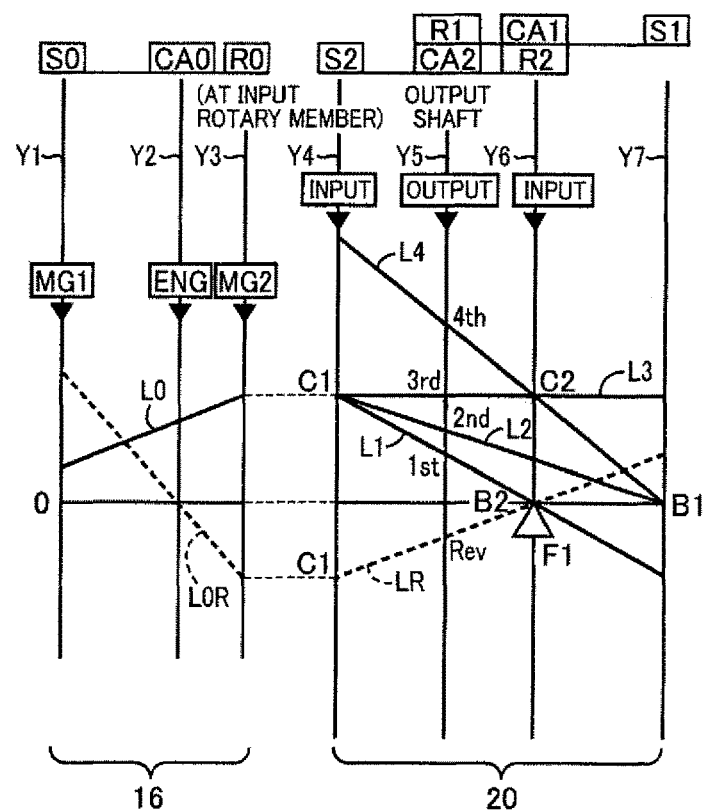
FIG. 2 is a table indicating a relationship between each gear position of a step-variable transmission portion and a combination of hydraulically-operated engagement devices of the step-variable transmission portion, which are placed in engaged states to establish the gear position in the vehicle of FIG. 1.
FIG. 3 is a collinear chart indicating a relationship among rotating speeds of rotary elements of a differential portion and the step-variable transmission portion.

FIG. 2 is a table indicating a relationship between each of a plurality of speed gear positions of the step-variable transmission portion 20 shown in FIG. 1 and a corresponding combination of the hydraulically-operated engagement devices placed in the engaged states to establish the each of the plurality of speed gear positions. As shown in the table of FIG. 2, the plurality of speed gear positions of the step-variable transmission portion 20 consist of four forward AT gear positions in the form of 1st gear position, 2nd gear position, 3rd gear position and 4th gear position. The 1st gear position has a gear ratio γat that is the highest among those of the four forward AT gear positions, while the 4th gear position has a gear ratio γat that is the lowest among those of the four forward AT gear positions. The gear ratio γat decreases in a direction from the 1st gear position (lowest-speed gear position) toward the 4th gear position (highest-speed gear position). In the table of FIG. 2, "O" indicates the engaged state of the engagement devices, "Δ" indicates the engaged state of the engagement device upon an engine brake or upon a coast shift-down action of the step-variable transmission portion 20, and blank indicates the released state of the engagement devices. The above-described one-way clutch F1 is disposed in parallel with the brake B2 that is placed in the engaged state to establish the 1st gear position, so that the brake B2 is not required to be placed in the engaged state upon starting or acceleration of the vehicle 10. It is noted that the step-variable transmission portion 20 is placed in a neutral position, i.e., in a power-transmission cutoff state without any of the gear positions being established in the step-variable transmission portion 20, when all of the engagement devices CB are placed in the released states.

In the driving apparatus 12 constructed as described above in the present embodiment, the step-variable transmission portion 20, which is connected to the differential portion 16 serving as the continuously-variable transmission, cooperates with the differential portion 16 to constitute a continuously-variable transmission as a whole. Further, the step-variable transmission portion 20 cooperates with the differential portion 16 to constitutes a transmission equivalent to a step-variable transmission as a whole, when a gear ratio of the differential portion 16 is controlled to a constant value. Specifically, the differential portion 16 is rendered operative to function as the continuously-variable transmission, and the step-variable transmission portion 20, connected to the differential portion 16 in series, is rendered operative to function as the step-variable transmission. This arrangement causes the rotational speed inputted to the step-variable transmission portion 20 (hereinafter referred to as input rotational speed of the step-variable transmission portion 20), i.e., the rotational speed of the transmitting member 18 to be continuously varied for each of at least one of gear positions M (consisting of the 1st gear position, 2nd gear position, 3rd gear position and 4th gear position) of the step-variable transmission portion 20, thereby making possible to establish a continuously variable gear ratio in each of the at least one of the gear positions M of the step-variable transmission portion 20. Accordingly, the driving apparatus 12 constitutes the continuously-variable transmission as a whole in which a total gear ratio (overall gear ratio) γT (=rotational speed Nin of the input shaft 14/rotational speed Nout of the output shaft 22) is continuously variable.

FIG. 3 shows a collinear chart indicating a relationship among rotational speeds of the first through seventh rotary modules RE1-RE7 in the differential portion 16 and the step-variable transmission portion 20 that cooperate to constitute the driving apparatus 12, wherein the relationship among the rotational speeds of the respective rotary modules in each of the gear positions is represented by a straight line. In FIG. 3, three vertical lines Y1, Y2, Y3, which are arranged in this order in a direction from left to right, represent rotational speeds of the respective three rotary modules RE1-RE3 of the differential portion 16, i.e., a rotational speed of the sun gear S0, a rotational gear of the carrier CA0 and a rotational speed of the ring gear R0 (that corresponds to the input rotational speed of the step-variable transmission portion 20), respectively. Other four vertical lines Y4, Y5, Y6, Y7, which are arranged in this order in a direction from left to right, represent rotational speeds of respective four rotary modules RE4-RE7 of the step-variable transmission portion 20, i.e., a rotational speed of the sun gear S2, a rotational speed of the ring gear R1 and the carrier CA2 that are connected to each other (which corresponds to the rotational speed of the output speed of the output shaft 22), a rotational speed of the carrier CA1 and the ring gear R2 that are connected to each other and a rotational speed of the sun gear S1. A distance between each adjacent one of the vertical lines Y1, Y2, Y3 is dependent on a corresponding one of gear ratios (i.e, ratios of number teeth) of the planetary gear device constituting the drive-force distributing device 26. A distance between each adjacent one of the vertical lines Y4, Y5, Y6, Y7 is dependent on a corresponding one of gear ratios (i.e, ratios of number teeth) of the first and second planetary gear devices 28, 30.

As shown in the collinear chart of FIG. 3, the driving apparatus 12 in the present embodiment is constructed such that, in the drive-force distributing device 26 (differential portion 16), the carrier CA0 constituting the second rotary module RE2 is connected to the engine 24 through the input shaft 14, the sun gear S0 constituting the first rotary module RE1 is connected to the first electric motor MG1, and the ring gear R0 constituting the third rotary module RE3 is connected to the transmitting member 18 and the second electric motor MG2, so that the rotation of the input shaft 14 is transmitted (inputted) to the step-variable transmission portion 20 through the transmitting member 18. An inclined straight line L0 represents the correlation between the rotational speeds of the sun gear S0 and the ring gear R0.

Further, in the step-variable transmission portion 20, the sun gear S2 constituting the fourth rotary module RE4 is selectively connected to the transmitting member 18 through the clutch C1, the ring gear R1 and the carrier CA2 constituting the fifth rotary module RE5 are connected to the output shaft 22, the carrier CA1 and the ring gear R2 constituting the sixth rotary module RE6 are selectively connected to the transmitting member 18 through the clutch C2 and are selectively connected to the casing 21 through the brake B2, and the sun gear S1 constituting the seventh rotary module RE7 is selectively connected to the casing 21 through the brake B1. In the step-variable transmission portion 20, the rotational speed of each of the first through seventh rotary modules RE1-RE7 is variable depending operation states of the clutches C and the brakes B. Each of inclined straight lines L1, L2, L3, L4, LR represents the correlation among the rotational speeds of the fourth through seventh rotary modules RE4-RE7 when a corresponding one of the 1st, 2nd, 3rd, 4th and reverse gear positions is established in the step-variable transmission portion 20.

In FIG. 3, the straight lines L0, L1, L2, L3, L4, which are indicated by solid lines, represent the correlation among the rotational speeds of the first through seventh rotary modules RE1-RE7 during forward running of the vehicle 10 in the hybrid running mode in which the vehicle 10 can run by at least operation of the engine 24 as the drive force source. Further, in the EV running mode in which the vehicle 10 can run by operation of the second electric motor MG2 with the engine 24 being stopped, the carrier CA0 of the differential portion 16 is not rotated, and the torque Tm2 of the second electric motor MG2 is inputted to the ring gear R0 of the differential portion 16, such that the torque Tm2 acts as a positive torque when the second electric motor MG2 is rotated in a forward direction, although not shown in FIG. 3. In this instance, the first electric motor MG1, which is connected to the sun gear S0 of the differential portion 16, receives no load, and is idled in a reverse direction. That is, in the EV running mode, the engine 24 is not operated with an engine rotational speed Ne (that is a rotational speed of the engine 24) being zero, and the torque Tm2 of the second electric motor MG2 is transmitted to the drive wheels 34 through the step-variable transmission portion 20 in which one of the 1st through 4th gear positions is established, so as to serve as a driving torque (motoring torque) for driving the vehicle 10. When the torque Tm2 acts in the forward direction, the torque Tm2 serves as the driving torque for driving the vehicle 10 in a forward direction. Further, in FIG. 3, straight lines L0R, LR, which are indicated by broken lines, represent the correlation among the rotational speeds of the first through seventh rotary modules RE1-RE7 during reverse running of the vehicle 10 in the EV running mode. During the reverse running in the EV running mode, the second electric motor MG2 is rotated in a reverse direction to generate a negative torque as the torque Tm2, which is inputted to the ring gear R0, and the negative torque Tm2 of the second electric motor MG2 is transmitted to the drive wheels 34 through the step-variable transmission portion 20 in which the 1st gear position is established, so as to serve as a driving torque for driving the vehicle 10 in a reverse direction.

Figure 4:
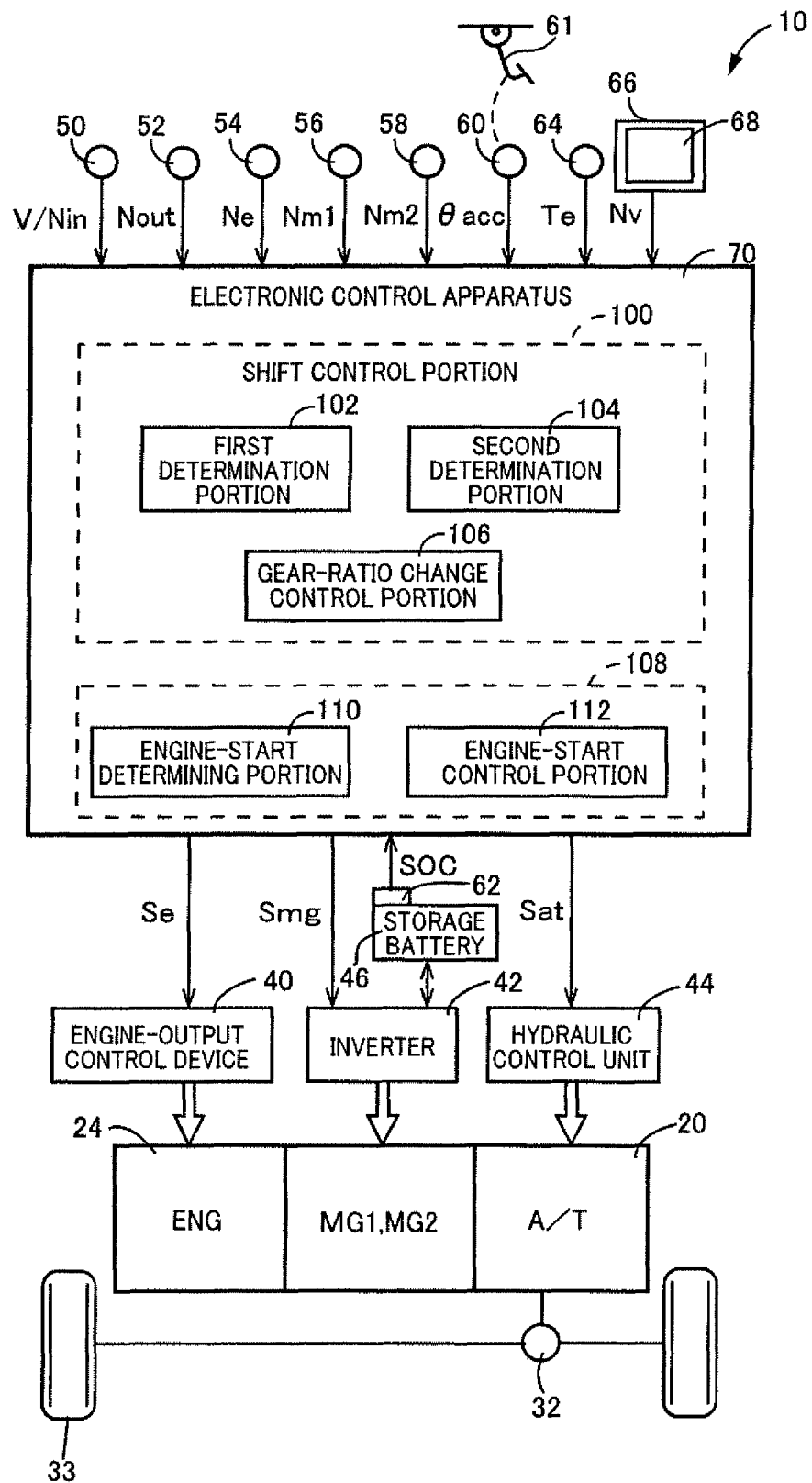
FIG. 4 is a view showing main portions of a control system provided in a driving apparatus of the vehicle of FIG. 1 for controlling the driving apparatus.

During the EV running, when an electric-power remaining amount SOC (state of charge) of a storage battery 46 that is shown in FIG. 4 is reduced, for example, the engine 24 is cranked to be started. When the engine 24 is to be cranked to be started, the first electric motor MG1 is required to output a torque Tm1, and the second electric motor MG2 is required to output a torque serving as a reaction torque that acts against the torque Tm1 generated by the first electric motor MG1.

FIG. 4 is a view showing main portions of a control system for performing various controls in the vehicle 10 to which the present invention is applied. The vehicle 10 includes the electronic control apparatus 70 serving as a controller configured to control an engine-output control device 40 for the engine 24, an inverter 42 for the first and second electric motors MG1, MG2, and the hydraulic control unit 44 for the step-variable transmission portion 20. Further, FIG. 4 is a functional block diagram showing major control functions and control portions of the electronic control apparatus 70. For example, the electronic control apparatus 70 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 70 may be constituted by two or more control units exclusively assigned to perform different control operations such as engine control operations and transmission shifting control operations. The electronic control apparatus 70 corresponds to "control apparatus" recited in the appended claims.

The electronic control apparatus 70 receives various input signals from various sensors provided on the vehicle 10, such as: an output signal of an input-shaft speed sensor 50 indicative of an input-shaft rotational speed Nin corresponding to the vehicle running speed V; an output signal of an output-shaft speed sensor 52 indicative of an output-shaft rotational speed Nout; an output signal of an engine speed sensor 54 indicative of the engine rotational speed Ne; an output signal of a first electric-motor speed sensor 56 indicative of a first electric-motor rotational speed Nm1 that is a rotational speed of the first electric motor MG1; an output signal of a second electric-motor speed sensor 58 indicative of a second electric-motor rotational speed Nm2 that is a rotational speed of the second electric motor MG2; an output signal of an accelerator-pedal operation degree sensor 60 indicative of an operation degree θacc of a vehicle-acceleration operation member in the form of an accelerator pedal 61, which operation degree θacc represents a degree of acceleration of the vehicle 10 required by the vehicle operator; an output signal of a battery sensor 62 indicative of the electric-power remaining amount SOC that is an amount of the electric power remaining in the storage battery 46; and an output signal of an engine temperature sensor 64 indicative of an engine temperature Te that is a temperature of the engine 24. The electronic control apparatus 70 receives also a navigation signal Nv from a navigation system 66 that includes a memory 68 storing therein various information. Further, the electronic control apparatus 70 generates various output signals to the various devices provided in the vehicle 10, such as: an engine control command signal Se to be supplied to the engine-output control device 40 for controlling the engine 24; electric-motor control command signals Smg to be supplied to the inverter 42 for controlling the first and second electric motors MG1, MG2; and hydraulic control command signals Sat to be supplied to the hydraulic control unit 44 for controlling the operation states of the clutches C and the brakes B (namely, for controlling shifting actions of the step-variable transmission portion 20).

As shown in FIG. 4 that is the functional block diagram showing the major control functions and the control portions of the electronic control apparatus 70, the electronic control device 70 includes a shift control means or portion in the form of a shift control portion 100 and an engine start means or portion in the form of an engine start portion 108. The shift control portion 100 includes a first determination means or portion in the form of a first determination portion 102, a second determination means or portion in the form of a second determination portion 104, and a gear-ratio change control means or portion in the form of a gear-ratio change control portion 106. When the engine 24 is to be started during running of the vehicle 10 with the engine 24 being stopped, the shift control portion 100 causes a currently selected one of the gear positions of the step-variable transmission portion 20 to be switched to another one of the gear positions, prior to starting of the engine 24. In this instance, a gear ratio of the other gear position (to which the currently selected gear position is switched) is different from a gear ratio of the currently selected gear position. For example, the gear ratio of the other gear position is higher than the gear ratio of the currently selected gear position. Specifically, when the electric-power remaining amount SOC of the storage battery 46 is smaller than a first threshold value As or a second threshold value Bs that is smaller than the first threshold value As, it is determined that a currently established gear ratio of the step-variable transmission portion 20 is to be changed to another gear ratio, and controls required to change the gear ratio are executed. The engine start portion 108 includes an engine-start determining means or portion in the form of an engine-start determining portion 110 and an engine-start control means or portion in the form of an engine-start control portion 112. When it is determined by the shift control portion 100 that the gear ratio of the transmission portion 20 is to be changed and then the gear ratio of the transmission portion 20 is changed by the shift control portion 100, the engine-start determining portion 110 determines that the engine 24 is to be started, and the engine-start control portion 112 causes the engine 24 to be started in accordance with the determination made by the engine-start determining portion 110. It is noted that an engine-start threshold value Cs, which is smaller than the first threshold value As and second threshold value Bs, may be additionally set, such that it is determined that the engine 24 is to be started when the electric-power remaining amount SOC of the storage battery 46 becomes smaller than the engine-start threshold value Cs.

Figure 5:
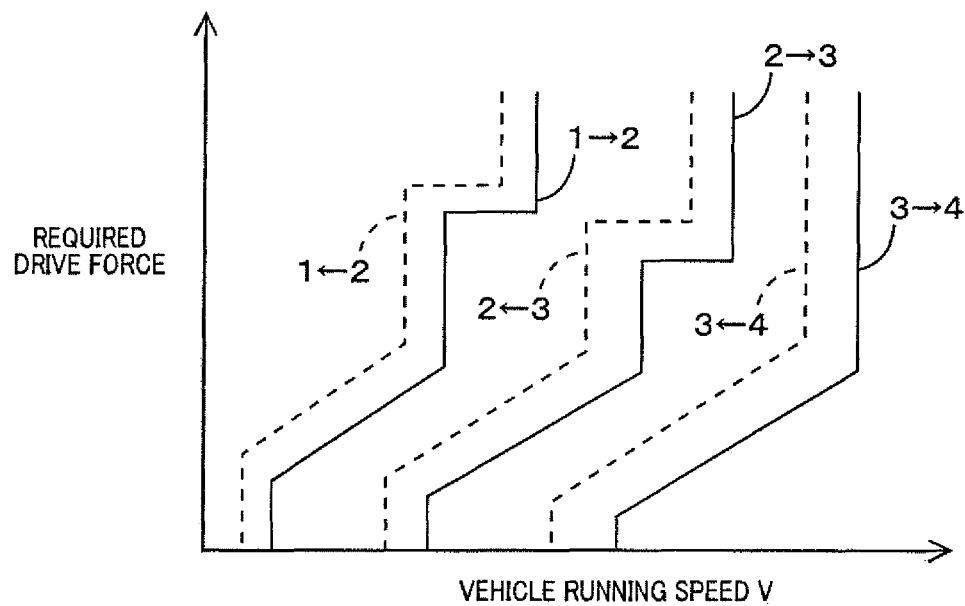
FIG. 5 is a view showing a shifting map in accordance with which a shift control is to be executed in a transmission mechanism in the form of the step-variable transmission portion shown in FIG. 5.

FIG. 5 shows a shifting map that is to be used when the electric-power remaining amount SOC of the storage battery 46 is not smaller than the first threshold value As. The gear-ratio change control portion 106 determines one of the plurality gear positions which is to be established in the step-variable transmission portion 20, based on an actual vehicle state that is represented by actual values of the vehicle running speed V and the accelerator operation degree θacc, in accordance with a known relationship in the form of the shifting map containing predetermined shift-up lines and shift-down lines each of which is defined by combinations of parameters such as the vehicle running speed V and the accelerator operation degree θacc that represent the required drive force, wherein the shift-up lines are represented by solid lines and the shift-down lines are represented by broken lines in FIG. 5. After determining the one of the gear positions which is to be established in the step-variable transmission portion 20, the gear-ratio change control portion 106 causes the step-variable transmission portion 20 to execute a shifting action to establish the determined one of the gear positions. The shift-up lines and shift-down lines of the shifting map are set such that one of the gear positions, which provides a high energy efficiency, is selected during the EV running of the vehicle 10.

Figure 6:
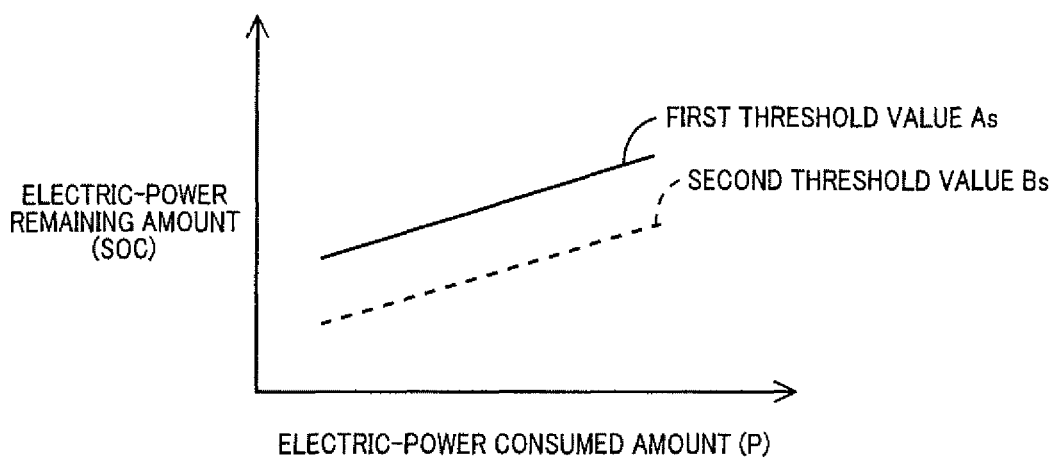
FIG. 6 is a view showing threshold values of an electric-power remaining amount, each of which is variable depending on an electric-power consumed amount, wherein the threshold values are to be used in a determination as to whether an engine of the vehicle is to be started.

FIG. 6 shows, by way of examples, the first threshold value As and the second threshold value Bs, which are indicated by solid line and broken line, respectively. The first threshold value As is a threshold value of the electric-power remaining amount SOC, which is variable depending on an electric-power consumed amount P that includes an amount of the electric power consumed by operation of the second electric motor MG2 by which the vehicle 10 is driven and also an amount of the electric power consumed by an air conditioner and auxiliary devices. The second threshold value Bs is a threshold value of the electric-power remaining amount SOC, which is smaller than the first threshold value As and which is also variable depending on the electric-power consumed amount P that includes the amount of the electric power consumed by operation of the second electric motor MG2 by which the vehicle 10 is driven and also the amount of the electric power consumed by the air conditioner and auxiliary devices.

The first determination portion 102 determines whether the electric-power remaining amount SOC is smaller than the first threshold value As. When it is determined by the first determination portion 102 that the electric-power remaining amount SOC is smaller than the first threshold value As, the second determination portion 104 determines whether the electric-power remaining amount SOC is smaller than the second threshold value Bs. When the electric-power remaining amount SOC of the storage battery 46 is not smaller than the second threshold value Bs with the operation degree θacc of the accelerator pedal 69 (hereinafter simply referred to as accelerator operation degree θacc) being reduced by at least a given value Δθa within a given length to of time, namely, when the accelerator operation degree θacc is returned toward zero with the electric-power remaining amount SOC being not smaller than the second threshold value Bs, the gear-ratio change control portion 106 causes a currently selected one of the gear positions of the step-variable transmission portion 20 to be switched to another one of the gear positions that has a gear ratio higher than that of the currently selected gear position, namely, causes a shift-down action to be executed in the step-variable transmission portion 20. As shown in FIG. 6, like the first threshold value As, the second threshold value Bs is a threshold value of the electric-power remaining amount SOC, which is variable depending on the electric-power consumed amount P that includes the amount of the electric power consumed by operation of the second electric motor MG2 by which the vehicle 10 is driven and also the amount of the electric power consumed by the air conditioner and the auxiliary devices. When the electric-power remaining amount SOC of the storage battery 46 is smaller than the second threshold value Bs, a shift-down action is executed. In this instance, since a change of the accelerator operation degree θacc is small, the executed shift-down action is, for example, a known iso-power shifting action by which the drive force, i.e., a power acting on the output shaft 22 is held substantially constant before, during and after the shifting action, for thereby reducing a difference of the drive force acting on the drive wheels 32 between before and after the shifting action so as to reduce a shifting shock caused upon the shifting action.

Figure 7:
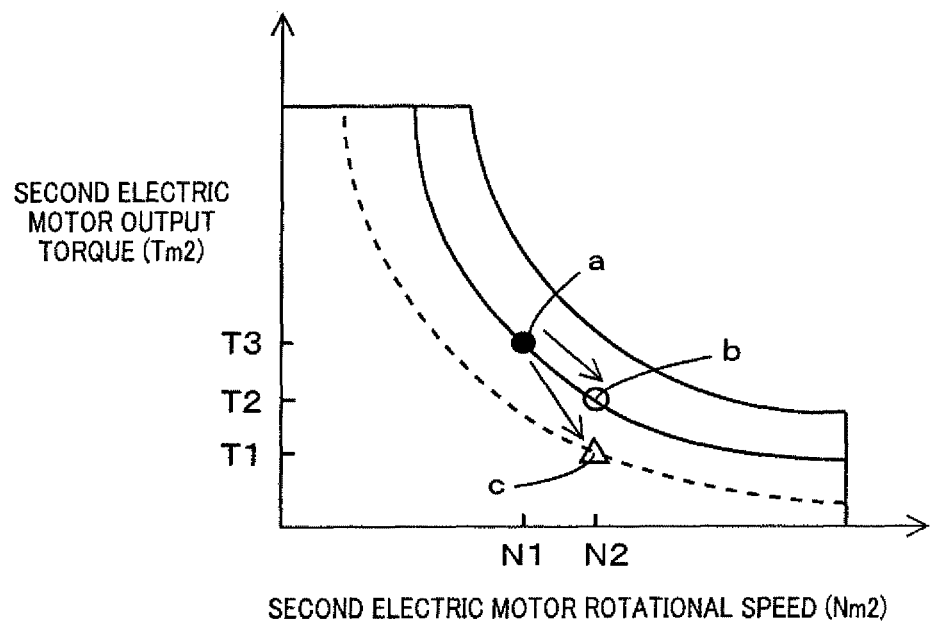
FIG. 7 is a view showing change of an operating point of an electric motor of the vehicle of FIG. 1, between before and after execution of a shift-down action in the transmission mechanism, wherein the operating point is defined a combination of a rotational speed and an output torque of the electric motor.

FIG. 7 shows (i) the shifting action from an operating point a to an operating point c, which is executed when the electric-power remaining amount SOC of the storage battery 46 is smaller than the first threshold value As and not smaller than the second threshold value Bs with the accelerator operation degree θacc being reduced by at least the given value Δθa within the given length to of time, and (ii) the shifting action (iso-power shifting action) from the operating point a to an operating point b, which is executed when the electric-power remaining amount SOC of the storage battery 46 is smaller than the second threshold value Bs. In the EV running with operation of the second electric motor MG2, a required torque is determined in accordance with the accelerator operation degree θacc, and the operating point (that is defined by a combination of an output torque Tm2 of the second electric motor MG2 and a rotational speed Nm2 of the second electric motor MG2) is determined based on the determined required torque. The operating point a is an operating point during running of the vehicle 10 with the 4th gear position being established in the step-variable transmission portion 20, in which the rotational speed Nm2 of the second electric motor MG2 is N1 while the output torque Tm2 of the second electric motor MG2 is T3. When the electric-power remaining amount SOC of the storage battery 46 is smaller than the first threshold value As and is not smaller than the second threshold value Bs, with the accelerator operation degree θacc being reduced by at least given value Δθa within the given length to of time, namely, with the required drive force being indicated by return of the accelerator operation degree toward zero, a shift-down action to the 3rd gear position is executed whereby the operating point a is changed to an operating point c in which the rotational speed Nm2 of the second electric motor MG2 is N2 while the output torque Tm2 of the second electric motor MG2 is T1. The operating point c lies on an iso-power line (indicated by broke line in FIG. 7) that is different from an iso-power line (indicated by solid line in FIG. 7) on which the operating point a lies. In this instance, uncomfortable feeling is not given much to an operator of the vehicle 10 even if a deceleration shock is caused by the execution of the shift-down action, because the deceleration shock results from the change of the accelerator operation degree θacc that is made by the return of the accelerator pedal 61 by the vehicle operator. Further, during running of the vehicle 10 at the operating point a with the 4th gear position being established in the step-variable transmission portion 20, when it is determined by the second determination portion 104 that the electric-power remaining amount SOC is made smaller than the second threshold value Bs, the iso-power shifting action is executed to the 3rd gear position whereby the operating point a is switched to the operating point b in which the rotational speed Nm2 of the second electric motor MG2 is N2 while the output torque Tm2 of the second electric motor MG2 is T2. The operating point b lies on the iso-power line (indicated by solid line in FIG. 7) on which the operating point a also lies.

Figure 8:
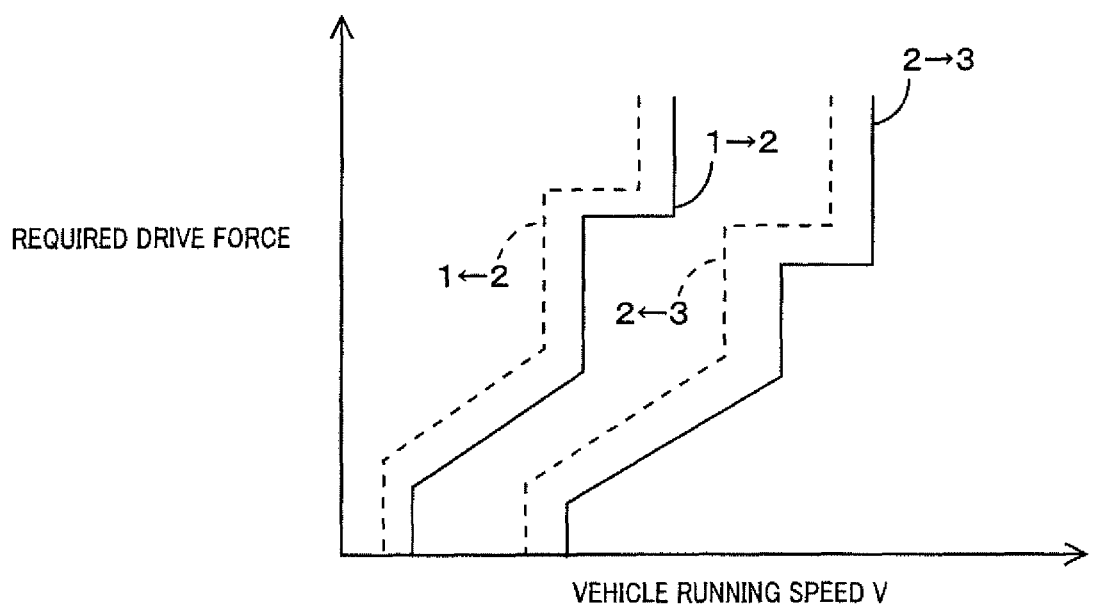
FIG. 8 is a view showing a shifting map that is to be used in place of the shifting map shown in FIG. 5, after the execution of the shift-down action in the transmission mechanism.

FIG. 8 shows, by way of example, a shifting map that is selected to be used after the above-described shift-down action has been executed in the case in which the electric-power remaining amount SOC of the storage battery 46 is smaller than the first threshold value As and is not smaller than the second threshold value Bs with the accelerator operation degree θacc being reduced by at least the given value Δθa within the given length to of time, or after the above-described shift-down action has been executed in the case in which the electric-power remaining amount SOC of the storage battery 46 is smaller than the second threshold value Bs. This shifting map is switched back to the shifting map shown in FIG. 5 by the gear-ratio change control portion 106 when the electric-power remaining amount SOC is made not smaller than the first threshold value As. As shown in FIG. 8, the step-variable transmission portion 20 is inhibited from establishing the 4th gear position when the shifting map of FIG. 8 is selected, so that, when the electric-power remaining amount SOC is made smaller than the first threshold value As, the step-variable transmission portion 20 is caused to establish the 3rd gear position in place of the 4th gear position, for thereby obtaining a required amount of the output torque Tm2 of the second electric motor MG2, which is required to start the engine 24. In the present embodiment, in the shifting map of FIG. 8, the shift-up lines from the 1st gear position to the 2nd gear position and from the 2nd gear position to the 3rd gear position and the shift-down lines from the 3rd gear position to the 2nd gear position and from the 2nd gear position to the 1st gear position are the same as those in the shifting map of FIG. 5. However, the shift-up lines and/or the shift-down lines in the shifting map of FIG. 8 may be different from those in the shifting map of FIG. 5. After one of the above-described shift-down actions has been executed, the shifting map of FIG. 5 is switched to the shifting map of FIG. 8, and then the engine 24 is started by cooperation of the engine-start determining portion 110 and the engine-start control portion 112.

FIG. 9 is a flow chart showing a control routine that is executed to start the engine 24 during the EV running of the vehicle 10 by operation of the second electric motor MG2 with the engine 24 being stopped, wherein, when the electric-power remaining amount SOC is smaller than the first threshold value As, prior to starting of the engine 24 for increasing the electric-power remaining amount SOC, a shift-down action is executed for thereby assuring a vehicle driving torque required to drive the vehicle 10 and an engine starting torque required to start the engine 24 while reducing a shock given to the vehicle operator. This control routine is executed, for example, in a repeated manner during the EV running of the vehicle 10.

As shown in FIG. 9, the control flow is initiated with step S10 corresponding to function of the first determination portion 102, which is implemented to determine whether the electric-power remaining amount SOC of the storage battery 46 is smaller than the first threshold value As. When a negative determination is made at step S10, the control flow goes back to step S10. That is, step S10 is repeatedly implemented as long as the negative determination is made at step S10. When an affirmative determination is made at step S10, step S20 corresponding to function of the second determination portion 104 is implemented to determine whether the electric-power remaining amount SOC of the storage battery 46 is smaller than the second threshold value Bs. When an affirmative determination is made at step S20, the control flow goes to step S50 corresponding to function of the gear-ratio change control portion 106, which is implemented to execute an iso-power shifting action as a shift-down action in the step-variable transmission portion 20. When a negative determination is made at step S20, step S30 corresponding to the gear-ratio change control portion 106 is implemented to determine whether the accelerator operation degree θacc is returned toward zero, namely, whether the accelerator operation degree θacc is reduced by at least the given value Δθa within the given length to of time. When a negative determination is made at step S30, the control flow goes back to step S10. When an affirmative determination is made at step S30, step S40 corresponding to function of the gear-ratio change control portion 106 is implemented to execute the shift-down action. Step S40 or step S50 is followed by step S60 corresponding to function of the gear-ratio change control portion 106, which is implemented to change the shifting map. At this step S60, the shifting map shown in FIG. 5 is switched to the shifting map shown in FIG. 8, for example. Step S60 is followed by step S70 corresponding to function of the engine-start determining portion 110 and the engine-start control portion 112, which is implemented to start the engine 24.

According to the present embodiment, the electronic control apparatus 70 is provided of the hybrid vehicle 10 that includes the engine 24 serving as the drive force source, the electric motor MG serving as the drive force source, the drive wheels 34, the storage battery 46 configured to supply and receive an electric power to and from the electric motor MG the step-variable transmission portion 20 configured to transmit the drive force supplied from each of the drive force sources toward the drive wheels 34. During running of the hybrid vehicle 10 by the drive force of the electric motor MG with the engine 24 being stopped, the electronic control apparatus 70 is configured to determine whether the engine 24 is to be started. When determining that the engine 24 is to be started during the running of the hybrid vehicle 10, the electronic control apparatus 70 is configured to cause the gear ratio of the step-variable transmission portion 20 to be changed and to cause the engine 24 to be started after the gear ratio of the step-variable transmission portion 20 has been changed. Owing to these arrangements, when it is determined that the engine 24 is to be started during the running of the vehicle 10 by operation of the electric motor MG with the engine 24 being stopped, the gear ratio of the step-variable transmission portion 20 is changed to, for example, a gear ratio value that makes the shock upon starting of the engine 24 smaller than a gear ratio which has been established in the step-variable transmission portion 20 before the gear ratio change, so that it is possible to reduce the shock which is caused, upon starting of the engine 24, by change of the drive force supplied from the electric motor MG to drive the vehicle 10, even when a sum of a vehicle driving torque required to drive the vehicle 10 and an engine starting torque required to start the engine 24 exceeds a torque available by supply from the electric motor MG due to insufficiency of the electric-power remaining amount of the storage battery 46.

According to the present embodiment, the electronic control apparatus 70 is configured to cause the gear ratio of the step-variable transmission portion 20 to be changed when the accelerator operation degree θacc is reduced during the running of the hybrid vehicle 10. Even if the shock is caused by the change of the gear ratio of the step-variable transmission portion 20, uncomfortable feeling is unlikely to be given to an operator of the vehicle 10, because the gear ratio of the step-variable transmission portion 20 is changed as a result of the reduction of the accelerator operation degree θacc which is made by an operation of the operator.

According to the present embodiment, when causing the gear ratio of the step-variable transmission portion 20 to be changed, the electronic control apparatus 70 is configured to control the electric motor MG such that the change of the magnitude of the drive force transmitted to the drive wheels 34 between before and after the change of the gear ratio is reduced. Owing to this arrangement, the shock caused by the change of the gear ratio of the step-variable transmission portion 20 is reduced.

According to the present embodiment, the electronic control apparatus 70 is configured to determine that the engine 24 is to be started during the running of the hybrid vehicle 10, when the electric-power remaining amount SOC of the storage battery 46 is smaller than the first threshold value As. Owing to this arrangement in which it is determined that the engine 24 is to be started when the electric-power remaining amount SOC of the storage battery 46 is small, the engine 24 is determined to be started at an appropriate point of time, so that a shock caused upon starting of the engine 24 is reduced.

According to the present embodiment, the electronic control apparatus 70 is configured to cause the gear ratio of the step-variable transmission portion 20 to be changed, when the accelerator operation degree θacc is reduced during the running of the hybrid vehicle 10, with the electric-power remaining amount SOC of the storage battery 46 being smaller than the first threshold value As and not smaller than the second threshold value Bs that is smaller than the first threshold value As. When the electric-power remaining amount SOC of the storage battery 46 is smaller than the second threshold value Bs that is smaller than the first threshold value As, the electronic control apparatus 70 is configured to cause the gear ratio of the step-variable transmission portion 20 to be changed and to control the electric motor MG such that the change of the magnitude of the drive force transmitted to the drive wheels 34 between before and after change of the gear ratio is reduced. Even if a shock is caused by the change of the gear ratio of the step-variable transmission portion 20 which is made as a result of the reduction of the accelerator operation degree θacc, uncomfortable feeling is unlikely to be given to the vehicle operator, because the gear ratio of the step-variable transmission portion 20 is changed as a result of an operation of the operator by which the accelerator operation degree θacc is reduced. Further, when the electric-power remaining amount SOC of the storage battery 46 is small, a higher priority is given to starting of the engine 24 and the electric motor MG is controlled to reduce the change of the magnitude of the drive force transmitted to the drive wheels 34 between before and after the change of the gear ratio, whereby the shock caused by the change of the gear ratio is reduced.

According to the present embodiment, the first threshold value As is a predetermined value that is variable depending on the electric-power consumed amount P that is the amount of the electric power consumed from the storage battery 46. Owing to this arrangement, the first threshold value As can be set accurately.

According to the present embodiment, the second threshold value Bs is a predetermined value that is variable depending on the electric-power consumed amount P that is the amount of the electric power consumed from the storage battery 46. Owing to this arrangement, the second threshold value Bs can be set accurately.

There will be described other embodiments of this invention. The same reference signs as used in the above-described embodiment will be used in the following embodiments, to identify the functionally corresponding elements, and descriptions thereof are not provided.

Second Embodiment

In the above-described first embodiment, each of the first and second threshold values As, Bs, which are predetermined threshold values of the electric-power remaining amount SOC of the storage battery 46, is variable depending on the electric-power consumed amount P that is an amount of the electric power consumed from the storage battery 46. However, at least one of the first and second threshold values As, Bs may be variable depending on a rate of change of the electric-power remaining amount SOC with respect to time, so that each of the at least one of the first and second threshold values As, Bs can be set to a more appropriate value.

Third Embodiment

In the above-described first embodiment, each of the first and second threshold values As, Bs, which are predetermined threshold values of the electric-power remaining amount SOC of the storage battery 46, is variable depending on the electric-power consumed amount P. However, at least one of the first and second threshold values As, Bs may be variable depending on the electric-power consumed amount P and also the rate of change of the electric-power remaining amount SOC with respect to time, so that each of the at least one of the first and second threshold values As, Bs can be set to a more appropriate value.

Fourth Embodiment

In the above-described first embodiment, the determination as to whether the engine 24 is to be started is made based on the electric-power remaining amount SOC of the storage battery 46. However, this determination may be made, in accordance with criteria that is variable depending on an area in which the hybrid vehicle 10 runs. For example, when a running plan is inputted to the navigation system 66 and the inputted running plan includes a plan to run in cities or urban areas in which a higher priority is to be given to the EV running, the engine-start determining portion 110 may make the above determination as to whether the engine 24 is to be started during running before running in the cities or urban areas (in which a higher priority is to be given to the EV running), such that a higher priority is given to the hybrid running during the running before the running in the cities or urban areas. As in the above-described embodiments, the gear-ratio change control portion 106 causes a shift-down action in the step-variable transmission portion 20, and the engine-start determining portion 110 and the engine-start control portion 112 cause the engine 24 to be started. In this forth embodiment, for example, at least one of the above-described first and second threshold values As, Bs (see FIG. 6), which are predetermined threshold values of the electric-power remaining amount SOC of the storage battery 46, may be set to be smaller during the running in the cities or urban areas than during the running in other areas other than the cities or urban areas. Therefore, in this fourth embodiment, it is possible to increase the electric-power remaining amount SOC of the storage battery 46 during the running in the other areas other than the cities or urban areas and to increase opportunities of the EV running in the cities or urban areas.

FIG. 10 is a flow chart showing a control routine that is to be executed for changing the gear position of the step-variable transmission portion 20 and starting the engine 24, depending on the running plan. As shown in FIG. 10, the control routine is initiated with step S110 corresponding to function of the engine-start determining portion 110, which is implemented to determine whether the engine 24 is to be started, namely, whether the EV running is to be switched to the hybrid running for increasing the electric-power remaining amount SOC of the storage battery 46. This determination is made, for example, depending on whether a plan to run in the cities or urban areas (in which a higher priority is to be given to the EV running) has been inputted to the running plan. When an affirmative determination is made at step S110, step S120 corresponding to function of the gear-ratio change control portion 106 is implemented to execute a shift-down action in the step-variable transmission portion 20, namely, to cause a currently selected one of the gear positions of the step-variable transmission portion 20 to be switched to another one of the gear positions whose gear ratio is higher than that of the currently selected one of the gear positions, before the engine 24 is started. Step S120 is followed by step S130 corresponding to functions of the engine-start determining portion 110 and the engine-start control portion 112, which is implemented to start the engine 24.

According to this fourth embodiment, the electronic control apparatus 70 is configured to determine whether the engine 24 is to be started or not, based on the running plan including at least one area in which the hybrid vehicle 10 runs. For example, where a higher priority is to be given to the running by the drive force of the electric motor MG during running of the vehicle 10 in a particular urban area, when it is determined that the engine 24 is to be started during the running of the vehicle 10, the gear ratio of the step-variable transmission portion 20 is changed to, for example, a gear ratio value that makes the shock upon starting of the engine 24 smaller than a gear ratio which has been established in the step-variable transmission portion 20 before the gear ratio change, so that it is possible to reduce the shock which is caused, upon starting of the engine 24, by change of the drive force supplied from the electric motor MG to drive the vehicle 10, and to assure the electric-power remaining amount of the storage battery 46 sufficiently so as to be ready for the running by the drive force of the electric motor MG.

Fifth Embodiment

In the above-described fourth embodiment, the determination as to whether the engine 24 is to be started is made based on the running plan of the vehicle 10. In this fifth embodiment, this determination is made depending on the engine temperature Te during running of the vehicle 10 and/or a length of time for which the engine 24 is stopped during running of the vehicle 10. That is, the engine-start determining portion 110 determines whether the engine 24 is to be started, in accordance with a predetermined map, depending on the engine temperature Te detected by the engine temperature sensor 64 and/or the length of time for which the engine 24 is stopped during running of the vehicle 10. The length of time is defined by a length of time from a point of time at which the vehicle 10 starts running until a point of time at which the engine 24 is started, or a length of time from a point of time at which the engine 24 is stopped until a point of time at which the engine 24 is started. When it is determined by the engine-start determining portion 110 that the engine 24 is to be started, the gear-ratio change control portion 106 causes a shift-down action to be executed in the step-variable transmission portion 20, and the engine-start determining portion 110 and the engine engine-start control portion 112 cause the engine 24 to be started.

The flow chart of FIG. 10 shows a control routine that is to be executed for changing the gear position of the step-variable transmission portion 20 and starting the engine 24, depending on the engine temperature and/or the engine stop time. As shown in FIG. 10, the control routine is initiated with step S110 corresponding to function of the engine-start determining portion 110, which is implemented to determine whether the engine 24 is to be started, namely, whether the EV running is to be switched to the hybrid running for increasing the electric-power remaining amount SOC of the storage battery 46. This determination is made depending on the engine temperature Te and/or the length of time for which the engine 24 is stopped during running of the vehicle 10. When an affirmative determination is made at step S110, step S120 corresponding to function of the gear-ratio change control portion 106 is implemented to execute a shift-down action in the step-variable transmission portion 20, namely, to cause a currently selected one of the gear positions of the step-variable transmission portion 20 to be switched to another one of the gear positions whose gear ratio is higher than that of the currently selected one of the gear positions, before the engine 24 is started. Step S120 is followed by step S130 corresponding to functions of the engine-start determining portion 110 and the engine-start control portion 112, which is implemented to start the engine 24.

According to this fifth embodiment, the electronic control apparatus 70 is configured to determine whether the engine 24 is to be started or not, depending on a temperature of the engine 24 during running of the vehicle 10 and/or a length of time for which the engine 24 is stopped during running of the vehicle 10. Thus, when the temperature Te of the engine 24 is low and/or when the length of time for which the engine 24 is stopped is long, namely, when it is desirable to start the engine 24, the engine 24 is started after the gear ratio of the step-variable transmission portion 20 is changed to, for example, a gear ratio value that makes the shock upon starting of the engine 24 smaller. Owing to this arrangement, it is possible to reduce the shock which is caused, upon starting of the engine 24, by change of the drive force applied to drive the vehicle 10, and also to keep the engine 24 in a fine condition.

While the preferred embodiments of this invention have been described in detail by reference to the drawings, it is to be understood that the invention may be otherwise embodied. For example, in the above-described first through third embodiments, when it is determined that the engine 24 is to be started as a result of reduction of the electric-power remaining amount SOC of the storage battery 46 during the EV running, a shift-up action is executed to increase the gear ratio of the step-variable transmission portion 20 before the engine 24 is started. However, where the step-variable transmission portion 20 has a gear position that could cause large resonance in other parts of the vehicle 10 such as a driving system of the vehicle 10, upon starting of the engine 24, a shifting action by which the currently selected gear position is switched to other gear position other than such a gear position causing the large resonance, may be executed.

In the above-described first through third embodiments, the shifting map (as an example of a conventional shifting map) shown in FIG. 5 is switched to the shifting map shown in FIG. 8 after the execution of the shift-down action when the electric-power remaining amount SOC of the storage battery 46 is reduced, and then the shifting map of FIG. 8 is switched back to the shifting map of FIG. 5 when the electric-power remaining amount SOC of the storage battery 46 becomes not smaller than the first threshold value threshold value As. However, this arrangement may be modified, for example, such that the shifting map of FIG. 8 is switched back to the shifting map of FIG. 5 after a given length of time passes after the engine 24 is started.

In the above-described embodiments, the transmission mechanism is constituted by the step-variable transmission portion 20 including the engagement devices in the form of the clutches C and brakes B. However, the step-variable transmission portion 20 may be replaced by, for example, a belt-type continuously-variable transmission including a pair of pulleys each having a variable effective diameter and a transmission belt looped over the pulleys.

In the above-described first through third embodiments, each of the first and second threshold values As, Bs, which are predetermined threshold values of the electric-power remaining amount SOC of the storage battery 46, is variable depending on the electric-power consumed amount P (that is the amount of the electric amount consumed from the storage batter 46), depending on a rate of change of the electric-power remaining amount SOC with respect to time, or depending on the electric-power consumed amount P and the rate of change of the electric-power remaining amount SOC with respect to time. However, both of the first and second threshold values As, Bs do not have to be necessarily variable depending on the same factor or factors.

It is to be understood that the embodiments described above are given for illustrative purpose only, and that the present invention may be embodied with various modifications and improvements which may occur to those skilled in the art.

NOMENCLATURE OF ELEMENTS

10: hybrid vehicle
20: step-variable transmission portion (transmission mechanism)
24: engine
34: drive wheels
46: storage battery
70: electronic control apparatus (control apparatus)
SOC: electric-power remaining amount
As: first threshold value
Bs: second threshold value
θacc: accelerator operation degree
P: electric-power consumed amount
MG1, MG2: electric motors
Te: engine temperature

What is claimed is:

1. A control apparatus for a hybrid vehicle that includes an engine serving as a drive force source, an electric motor serving as a drive force source, drive wheels, a storage battery configured to supply and receive an electric power to and from the electric motor, and a transmission mechanism configured to transmit a drive force supplied from each of the drive force sources toward the drive wheels, the transmission mechanism being a step-variable transmission that selectively establishes one of a plurality of different gear positions each having a different gear ratio, the control apparatus being configured to:
   (i) determine when the engine is to be started during running of the hybrid vehicle by the drive force of the electric motor with the engine being stopped, and
   (ii) when determining that the engine is to be started during the running of the hybrid vehicle, cause the transmission mechanism to change from a first one of the plurality of gear positions having a first gear ratio used before the engine is started to a second one of the plurality of gear positions having a second gear ratio different from the first gear ratio and cause the engine to be started after the transmission mechanism has changed to the second one of the plurality of gear positions having the second gear ratio.

2. The control apparatus according to claim 1, wherein the control apparatus is configured to cause the gear position of the transmission mechanism to be changed when an operation degree of an accelerator is reduced during the running of the hybrid vehicle.

3. The control apparatus according to claim 1, wherein, when causing the gear position of the transmission mechanism to be changed, the control apparatus controls the electric motor to reduce a magnitude of the drive force transmitted to the drive wheels.

4. The control apparatus according to claim 1, wherein the control apparatus is configured to determine that the engine is to be started during the running of the hybrid vehicle, when an amount of the electric power remaining in the storage battery is less than a first threshold value.

5. The control apparatus according to claim 4, wherein the control apparatus is configured to:
   cause the gear ratio position of the transmission mechanism to be changed, when an operation degree of an accelerator is reduced during the running of the hybrid vehicle, with the amount of the electric power remaining in the storage battery being less than the first threshold value and not less than a second threshold value that is less than the first threshold value, and
   when the amount of the electric power remaining in the storage battery is less than the second threshold value, cause the gear position of the transmission mechanism to be changed and control the electric motor to reduce a magnitude of the drive force transmitted to the drive wheels.

6. The control apparatus according to claim 4, wherein the first threshold value is a predetermined value that is based on an amount of the electric power consumed from the storage battery.

7. The control apparatus according to claim 4, wherein the first threshold value is a predetermined value that is based on a rate of change of the amount of the electric power remaining in the storage battery with respect to time.

8. The control apparatus according to claim 4, wherein the first threshold value is a predetermined value that is based on (i) an amount of the electric power consumed from the storage battery and (ii) a rate of change of the amount of the electric power remaining in the storage battery with respect to time.

9. The control apparatus according to claim 5, wherein the second threshold value is a predetermined value that is based on an amount of the electric power consumed from the storage battery.

10. The control apparatus according to claim 5, wherein the second threshold value is a predetermined value that is based on a rate of change of the amount of the electric power remaining in the storage battery with respect to time.

11. The control apparatus according to claim 5, wherein the second threshold value is a predetermined value that is based on (i) an amount of the electric power consumed from the storage battery and (ii) a rate of change of the amount of the electric power remaining in the storage battery with respect to time.

12. The control apparatus according to claim 1, wherein the control apparatus is configured to determine when the engine is to be started, based on a running plan including at least one area in which the hybrid vehicle runs.

13. The control apparatus according to claim 1, wherein the control apparatus is configured to determine when the engine is to be started or not, depending on a temperature of the engine during running of the vehicle and/or a length of time for which the engine is stopped during running of the vehicle.

14. The control apparatus according to claim 1, wherein the control apparatus is configured to, when determining that the engine is to be started during the running of the hybrid vehicle, cause the gear position to change so that the gear ratio of the transmission mechanism is increased and cause the engine to be started after the gear ratio of the transmission mechanism has been increased.

15. The control apparatus according to claim 1, wherein the control apparatus includes:
   an engine start portion configured to determine when the engine is to be started during the running of the hybrid vehicle, and
   a shift control portion configured to cause the gear position of the transmission mechanism to be changed when the engine start portion determines that the engine is to be started,
   wherein the engine start portion is configured to, when determining that the engine is to be started, cause the engine to be started after the gear position of the transmission mechanism has been changed by the shift control portion.

16. A hybrid vehicle comprising:

the engine, the electric motor, the drive wheels, the storage battery and the transmission mechanism defined in claim 1; and the control apparatus according to claim 1.

* * * * *